Patented Aug. 8, 1950

2,517,929

UNITED STATES PATENT OFFICE 2,517,929

NAPHTHYRIDINE DERIVATIVES

Carl Richter, Schaffhausen, Switzerland, assignor to Cilag Limited, Schaffhausen, Switzerland, a Swiss company No Drawing. Application August 15, 1949, Serial No. 110,470. In Switzerland August 31, 1948

14 Claims. (Cl. 260—296)

This invention relates to a series of new compounds of the general formula:

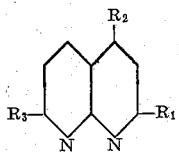

wherein $R_1$ is an alkoxy or thioalkyl radical, whilst one hydrogen atom of the alkyl group may be replaced by an alkoxy or dialkylamino group, $R_2$ represents an alkyl, aryl or aralkyl radical and $R_3$ is an amino group or an alkylamino, dialkylamino or acylamino group, or has the same meaning as $R_1$. It has been found that these derivatives of naphthyridine are surprisingly effective against micro-organisms, for example bacteria, protozoa, such as amoeba, and the like, and further are valuable as disinfectants both for objects and also for the living body, especially as wound disinfectants and intestinal disinfectants. They can be employed in the form of powders and solutions or worked up into sprays, emulsions, suspensions, pastes, ointments, powders and the like for rubbing in, taking by mouth, injection, spraying, impregnating and the like.

The new compounds can be produced by methods known per se.

The present invention provides a particularly advantageous process for the production of naphthyridine derivatives of the above-mentioned general formula, wherein a compound of the general formula:

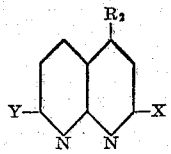

in which X represents a halogen atom, $R_2$ an alkyl, aryl or aralkyl radical and Y a halogen atom, the amino group or an alkylamino, dialkylamino or acylamino group, is reacted preferably in the presence of a condensing agent with an aliphatic alcohol or thioalcohol in which one hydrogen atom of the alkyl group may be replaced by the alkoxy or dialkylamino group. An alkali alcoholate or alkali thioalcoholate of the alcohol or thioalcohol used in the reaction is preferably employed as the condensing agent.

The following examples show how the process of the invention may be carried into effect.

Example 1

10.5 gms. of sodium are dissolved in 2.5 litres of absolute n-butanol and to the hot solution 80 gms. of 2-chloro-4-methyl-7-amino-1.8 - naphthyridine are added. The mixture is boiled for three hours under reflux and then allowed to cool. The reaction solution is washed with water until it has a neutral reaction, dried and evaporated in vacuo. The residue consisting of 2-n-butoxy-4-methyl-7-amino-1.8-naphthyridine is recrystallised from acetic ester. Yield 76 gms. corresponding to 95% of the theoretical. The new naphthyridine derivative forms light yellow crystals which melt at 159–161° C. and are readily soluble in methanol, acetone and chloroform.

Example 2

100 gms. of 2.7 dichloro-4-methyl-1.8 naphthyridine are gradually introduced into a solution of 27 gms. sodium in one litre of n-butanol. The solution heats up by itself to boiling and is then boiled for 24 hours more. The sodium chloride which separates out is sucked off and washed with benzene. The combined filtrates are washed with water until they give a neutral reaction and dried. The solvent is evaporated and the residue consisting of 2.7-bis-(n-butoxy)-4-methyl-1.8-naphthyridine is distilled under a high vacuum. Yield: 130 gms. corresponds to 96% of the theoretical. The naphthyridine derivative thus obtained forms a light yellow oil boiling at 168–169° C. under a pressure of 0.015 mm. It is insoluble in water, but miscible with usual organic solvents.

Example 3

19.6 gms. of sodium and 2 litres of absolute toluene are stirred with a rotary stirrer under reflux. 100 gms. of 2-diethylamino ethanol are allowed to drop into the mixture. After stirring for four hours a further 45 gms. of 2-diethylamino ethanol are dropped in. The mixture is then heated further until the sodium is completely dissolved. 150 gms. of 2-chloro-4-methyl-7-amino-1.8-naphthyridine are added in portions to the solution whilst stirring with a rotary stirrer and heating and the solution is heated for 24 hours under a reflux condenser. The common salt which precipitates is sucked off and washed well with benzene. The filtrates are shaken out with water and dried, the solvent is evaporated and the residue remaining is recrystallised from a mixture of benzene and petroleum ether. The 2-(2'-diethylamino - ethoxy)-4-methyl-7-amino-1.8-naphthyridine obtained in a yield of 151 gms. (71% of the theoretical) melts at 123–124° C., is very readily soluble in dilute acids, is readily soluble in the usual organic solvents with the exception of petroleum ether, and is sparingly soluble in water.

Example 4

23.6 gms. of sodium are distributed in boiling toluene whilst stirring with a rotary stirrer and 121 gms. of diethylamino ethanol are then added slowly. After boiling for three hours 100 gms. of 2.7-dichloro-4-methyl-1.8-naphthyridine dissolved in 500 ccs. of hot toluene are dropped in, whereupon the mixture is boiled for a further 24 hours under reflux condenser. The common salt produced is filtered off, the filtrate is washed with water and dried. After evaporation of the solvent the residue is rectified under a high vacuum. The 2.7-bis(2'-diethylaminoethoxy)-4-methyl-1.8-naphthyridine thus obtained is a light yellow oil of boiling point 202–204° C. (0.008 mm.). It is sparingly soluble in water and readily soluble in most organic solvents. Yield 125 gms.

Example 5

13 gms. of sodium are dissolved in 1.5 litres of absolute ethanol and 76 gms. of 2-diethylamino ethanthiol are dropped into this solution. The mixture is heated to boiling and 100 gms. of 2-chloro-4-methyl-7-amino-1.8-naphthyridine are added in small portions. The mixture is boiled for seven hours whilst stirring with a rotary stirrer, the precipitated common salt is sucked off and washed with absolute ethanol. The combined filtrates are evaporated, the residue is dissolved in one litre of 2 N acetic acid, the solution is filtered, neutralised with concentrated caustic soda, and saturated soda solution is then added and the solution extracted with chloroform. The solution thus obtained is washed, evaporated to dryness and the residue recrystallised from absolute methanol. The 2-(2'-diethylamino-ethylamercapto)-4-methyl-7-amino-1.8-naphthyridine thus obtained in a yield of 104 gms. melts at 182–184° C. and is very readily soluble in dilute mineral acids and organic acids.

Example 6

30 gms. of sodium are dissolved in one litre of absolute ethanol and 175 gms. of 2-diethylamino ethanthiol are added to the solution while the latter is still hot. The mixture is heated to boiling and 133 gms. of 2.7-dichloro-4-methyl-1.8-naphthyridine are added in small portions whereupon common salt immediately separates. After boiling and stirring with a rotary stirrer for eight hours the reaction mixture is cooled and worked up as described in Example 5. The 2.7-bis-(2'-diethylaminoethylmercapto)-4-methyl-1.8-naphthyridine melts at 64–65° C., is insoluble in water and alkalies, and readily soluble in dilute mineral acids and in organic solvents. It can be recrystallised particularly well from petroleum ether. The yield amounts to 70% of the theoretical.

In a similar way to that described in the examples the following compounds can be obtained:

2-(3'-diethylamino-n-propoxy)-4-benzyl-7-amino-1.8-naphthyridine from 2-chloro-4-benzyl-7-amino-1.8-naphthyridine and 3-diethylamino-n-propanol.

2-(2'-ethoxyethoxy)-4-phenyl-7-amino-1.8-naphthyridine from 2-chloro-4-phenyl-7-amino-1.8-naphthyridine and 2-ethoxyethanol.

2.7-bis-(3'-diethylamino-n-butoxy)-4-ethyl-1.8-naphthyridine from 2.7-dichloro-4-ethyl-1.8-naphthyridine and 3-diethylamino-n-butanol.

2-(4'-diethylamino-n-butylmercapto)-4-n-propyl-7-diethylamino-1.8-naphthyridine from 2-chloro-4-n-propyl-7-diethylamino-1.8-naphthyridine and 4-diethylamino-n-butanthiol.

2-(2'-n-butoxyethylmercapto)-4-(2'-phenylethyl)-7-n-valeroylamino-1.8-naphthyridine from 2-brom-4-(2'-phenylethyl)-7-n-valeroylamino-1.8-naphthyridine and 2-n-butoxyethanthiol.

2-(3'-di-n-butylaminopropylmercapto)-4-tert.-butyl-7-(2'-butylamino)-1.8-naphthyridine from 2-iodo-4-tert.-butyl-7-(2'-butylamino)-1.8-naphthyridine and 3-di-n-butylaminopropanthiol.

2.7-bis-(2'-di-tert.-butylaminoethylmercapto)-4-(1'-phenylethyl)-1.8-naphthyridine from 2.7-dibromo-4-(1'-phenylethyl)-1.8-naphthyridine and 2-di-tert.-butylaminoethanthiol.

2-(4'-diethylamino-2',3'-buten-1'-oxy)-4-n-butyl-7-acetylamino-1.8-naphthyridine from 2-iodo-4-n-butyl-7-acetylamino-1.8-naphthyridine and 4-diethylamino-2.3-buten-1-ol.

The new naphthyridine derivatives may also be isolated in the form of their salts, for example as citric acid salts, which are very readily soluble in water.

What I claim is:

1. Chemical compounds of the general formula:

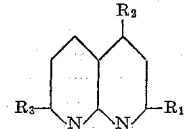

in which $R_1$ is a substituent selected from the group consisting of lower alkoxy radicals, lower thioalkyl radicals, lower alkoxy radicals in which one hydrogen atom of the alkoxy radical has been replaced by a lower alkoxy group, lower alkoxy radicals in which one hydrogen atom of the alkoxy radical has been replaced by a lower dialkylamino group, lower thioalkyl radicals in which one hydrogen atom of the thioalkyl radical has been replaced by a lower alkoxy group, and lower thioalkyl radicals in which one hydrogen atom of the thioalkyl radical has been replaced by a lower dialkylamino group, $R_2$ is a substituent selected from the group consisting of lower alkyl, aryl and aralkyl hydrocarbon radicals, and $R_3$ is a substituent selected from the group consisting of the amino group, lower alkylamino radicals, lower dialkylamino radicals, acylamino radicals, lower alkoxy radicals, lower thioalkyl radicals, lower alkoxy radicals in which one hydrogen atom of the alkoxy radical has been replaced by a lower alkoxy group, lower alkoxy radicals in which one hydrogen atom of the alkoxy radical has been replaced by a lower dialkylamino group, lower thioalkyl radicals in which one hydrogen atom of the thioalkyl radical has been replaced by a lower alkoxy group, and lower thioalkyl radicals in which one hydrogen atom of the thioalkyl radical has been replaced by a lower dialkylamino group.

2. The chemical compound of the formula:

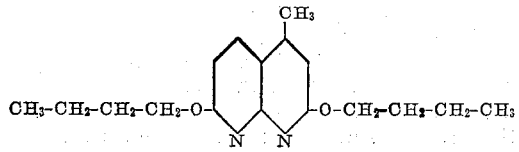

3. The chemical compound of the formula:

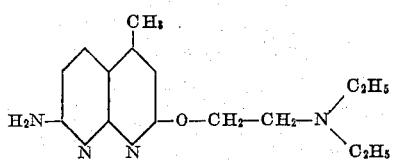

4. The chemical compound of the formula:

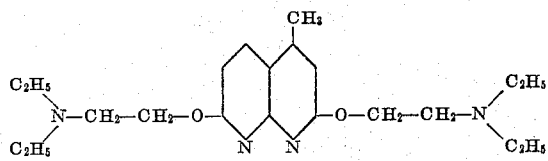

5. The chemical compound of the formula:

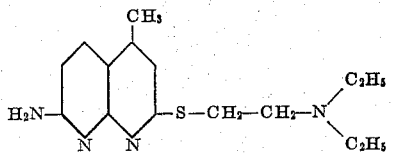

6. The chemical compound of the formula:

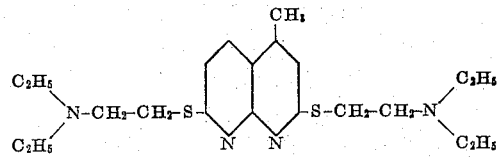

7. A process for the production of new derivatives of naphthyridine which comprises reacting in the presence of a condensing agent a compound of the general formula:

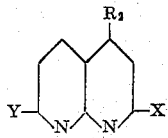

in which X is a halogen atom, $R_2$ is a substituent selected from the group consisting of lower alkyl, aryl and aralkyl hydrocarbon radicals, and Y is a substituent selected from the group consisting of halogen atoms, amino, lower alkylamino, lower dialkylamino and acylamino groups, with a compound selected from the group consisting of lower aliphatic alcohols, lower aliphatic thioalcohols, lower aliphatic alcohols in which one hydrogen atom of the alkyl group has been replaced by a lower dialkylamino group, and lower aliphatic thio-alcohols in which one hydrogen atom of the thio-alkyl group has been replaced by a lower dialkylamino group.

8. A process as claimed in claim 7 wherein an alkali alcoholate of the alcohol used for the reaction is used as the condensing agent.

9. A process as claimed in claim 7 wherein an alkali thio-alcoholate of the alcohol used for the reaction is used as the condensing agent.

10. A process for the production of 2-(2'-diethylaminoethoxy) - 4 - methyl - 7 - amino - 1,8-naphthyridine which comprises reacting a 2-halogeno-4-methyl-7-amino-1,8 - naphthyridine with diethylaminoethanol.

11. A process for the production of 2-(2'-diethylaminoethylmercapto)-4-methyl-7 - amino-1,8-naphthyridine which comprises reacting a 2-halogeno-4-methyl-7-amino-1,8 - naphthyridine with diethylaminoethanthiol.

12. A process for the production of 2,7-bis-(n-butoxy)-4-methyl-1,8-naphthyridine which comprises reacting 2,7 - dihalogeno - 4 - methyl-1,8-naphthyridine with n-butanol.

13. A process for the production of 2,7-bis-(2'-diethylaminoethoxy)-4-methyl-1,8 - naphthyridine which comprises reacting a 2,7-dihalogeno 4-methyl-1,8-naphthyridine with diethylaminoethanol.

14. A process for the production of 2,7-bis-(2'-diethylaminoethylmercapto) - 4 - methyl - 1,8-naphthyridine which comprises reacting a 2,7-dihalogeno-4-methyl-1,8-naphthyridine with diethylaminoethanthiol.

CARL RICHTER.

No references cited.